(12) United States Patent
De Amorim Novais Da Costa Nóbrega et al.

(10) Patent No.: US 9,156,984 B2
(45) Date of Patent: Oct. 13, 2015

(54) METHOD FOR PREPARING COATED BINDER UNITS AND A SYSTEM FOR USE THEREIN

(75) Inventors: João Miguel De Amorim Novais Da Costa Nóbrega, Braga (PT); Eurico Filipe Dias Pessoa, Braga (PT); José António Colaço Gomes Covas, Braga (PT); Sophie Nigen-Chaidron, Kuala Lumpur (MY)

(73) Assignee: Shell Oil Company, Houston, TX (US)

( * ) Notice: Subject to any disclaimer, the term of this patent is extended or adjusted under 35 U.S.C. 154(b) by 701 days.

(21) Appl. No.: 13/513,415

(22) PCT Filed: Dec. 2, 2010

(86) PCT No.: PCT/EP2010/068773
§ 371 (c)(1),
(2), (4) Date: Sep. 10, 2012

(87) PCT Pub. No.: WO2011/067355
PCT Pub. Date: Jun. 9, 2011

(65) Prior Publication Data
US 2012/0328777 A1      Dec. 27, 2012

(30) Foreign Application Priority Data
Dec. 4, 2009   (EP) .................................... 09306186

(51) Int. Cl.
*B05D 7/00* (2006.01)
*C08L 95/00* (2006.01)
(Continued)

(52) U.S. Cl.
CPC ............... *C08L 95/00* (2013.01); *B29C 47/084* (2013.01); *B29C 47/126* (2013.01); *B29C 65/02* (2013.01); *B29C 65/743* (2013.01); *B29C 66/1122* (2013.01); *B29C 66/4312* (2013.01); *B29C 66/723* (2013.01); *B29C 66/83533* (2013.01); *B29C 66/8432* (2013.01); *B29C 66/939* (2013.01); *B29C 66/93451* (2013.01); *E01C 7/18* (2013.01); *E01C 7/30* (2013.01); *B29C 47/0011* (2013.01); *B29C 47/0016* (2013.01);
(Continued)

(58) Field of Classification Search
None
See application file for complete search history.

(56) References Cited

U.S. PATENT DOCUMENTS

| 3,026,568 A | 3/1962 | Moar | 18/47.2 |
| 3,091,012 A | 5/1963 | Bell | 25/2 |

(Continued)

FOREIGN PATENT DOCUMENTS

| EP | 1361256 | 11/2003 | C08L 95/00 |
| WO | WO2009153324 | 12/2009 | B29B 11/10 |

*Primary Examiner* — Erma Cameron
(74) *Attorney, Agent, or Firm* — Charles W. Stewart

(57) ABSTRACT

A method for preparing a plurality of coated binder units wherein each of the coated binder units comprises a core of a binder coated with a layer of coating material, which method comprises the steps of: (a) providing a coated binder which comprises a core of a binder coated with a layer of coating material; and (b) dividing the coated binder into the plurality of the coated binder units by means of a system which comprises a first and a second loop that engage over part of their lengths and rotate in opposite directions, the first loop comprising a first repeating sequence of interlinked molds and the second loop comprising a second repeating sequence of interlinked molds, whereby the coated binder units are formed by welding edges of the coating and cutting the extrudate into pieces in a region where the first and the second loops engage. The invention further relates to said system.

16 Claims, 4 Drawing Sheets

(51) Int. Cl.
  *B29C 47/08* (2006.01)
  *B29C 47/12* (2006.01)
  *B29C 65/02* (2006.01)
  *B29C 65/74* (2006.01)
  *B29C 65/00* (2006.01)
  *E01C 7/18* (2006.01)
  *E01C 7/30* (2006.01)
  *B29C 47/00* (2006.01)
  *B29K 95/00* (2006.01)
  *B29K 105/00* (2006.01)
  *B29C 47/02* (2006.01)
  *B29C 47/06* (2006.01)

(52) U.S. Cl.
  CPC ......... *B29C 47/0023* (2013.01); *B29C 47/0026* (2013.01); *B29C 47/0066* (2013.01); *B29C 47/021* (2013.01); *B29C 47/062* (2013.01); *B29C 47/128* (2013.01); *B29C 66/8762* (2013.01); *B29C 66/9161* (2013.01); *B29C 66/949* (2013.01); *B29C 2793/009* (2013.01); *B29C 2793/0027* (2013.01); *B29K 2095/00* (2013.01); *B29K 2105/251* (2013.01)

(56) References Cited

U.S. PATENT DOCUMENTS

| | | |
|---|---|---|
| 4,769,288 A | 9/1988 | Saylak |
| 5,254,385 A | 10/1993 | Hazlett ........................ 428/76 |
| 5,637,350 A | 6/1997 | Ross |
| 2006/0288907 A1* | 12/2006 | Fox ........................ 106/281.1 |
| 2008/0015288 A1 | 1/2008 | Antoine et al. ................. 524/69 |
| 2008/0242770 A1 | 10/2008 | Thomas ........................ 524/59 |
| 2009/0153324 A1 | 6/2009 | Goodnow et al. |

* cited by examiner

US 9,156,984 B2

METHOD FOR PREPARING COATED BINDER UNITS AND A SYSTEM FOR USE THEREIN

PRIORITY CLAIM

This is a U.S. National Stage application under 35 USC 371 of International Application No. PCT/EP2010/068773, filed 2 Dec. 2010, which claims priority to European Application No. 09306186.9, filed 4 Dec. 2009.

FIELD OF THE INVENTION

The invention relates to a method for preparing coated binder units, and to a system for use in said method.

BACKGROUND OF THE INVENTION

Bitumen is a viscous liquid or a solid consisting essentially of hydrocarbons and their derivatives. It is soluble in trichloroethylene and softens gradually when heated. Bitumen is used as a binder in a variety of applications. Bitumen may be combined with aggregate to provide asphalt that can be used in the manufacture of roads. Alternatively, bitumen may be used in industrial applications such as roofing, flooring or sealing.

In recent years synthetic binders have also been used. Synthetic binders, such as Shell's Mexphalte C® possess similar rheological and mechanical properties to the bituminous binders typically used in road applications. The synthetic binders are typically clear, so they are readily pigmented and are used to obtain coloured asphalt mixture. In this description, the term "binder" covers both bituminous materials and synthetic materials having similar rheological and mechanical properties. The term "asphalt" in the present description is used to describe a mixture of binder and aggregate.

Bituminous and synthetic binders are typically transported in the heated state to ensure that they are sufficiently fluid for use. However, this is costly in terms of energy usage and requires strict safety procedures. Also, if the binder is stored at elevated temperature for an extended period this can lead to changes in the properties of the binder, so storage time is typically limited to avoid degradation in binder properties.

It is desirable to transport and store the binder at ambient temperature, preferably as units of a size and shape that are readily handled. The term "unit" as used in the present description encompasses a wide variety of discrete solid entities such as pellets, rods, sheets etc. However, the binders tend to be extremely sticky so that the units creep and agglomerate, particularly when stored at ambient temperature for extended periods. Efforts have been made to produce binder units that are not subject to agglomeration.

U.S. Pat. No. 3,026,568 describes a process wherein coated bitumen pellets are prepared by spraying molten bitumen into a stream of air carrying a powdered material such as powdered limestone. The purpose of the coating is to prevent the pellets from adhering to one another. It has proved difficult to practise this method on an industrial scale.

U.S. Pat. No. 5,254,385 describes encapsulated asphalt (bitumen) articles wherein bitumen is contained inside a polymer cover. A polymeric material is heat sealed to form a three side container or pouch, molten bitumen is poured into the pouch, and the remaining opening of the container is closed by heat sealing. The encapsulation prevents separate bitumen elements from agglomerating, adhering or coalescing to form larger masses of bitumen. The encapsulation process is likely to be slow, and is probably too costly to be applied on a large scale.

EP 1 361 256 describes a method for preparing granules wherein an oil is mixed with polyethylene, a bituminous material is added, and the resulting mixture is subjected to mixing extrusion. The resulting granules can be described as a mixture of a polyethylene phase and a bituminous phase in which the polyethylene phase is a semi-continuous phase and the bitumen phase is a discontinuous phase. A high proportion of polymer in the granules is needed to prevent deformation of the granules, and this may detrimentally alter the properties of the bitumen and/or may increase the cost of the granules such that they are unlikely to be economical.

US 2008/0015288 describes an extrusion process for preparing master batch granules comprising bitumen and polymer. To prevent the granules from sticking, an anti-sticking agent may be included in the granules, e.g. by adding the anti-sticking agent directly to the extruder, or the anti-sticking agent may be applied to the surface of the extrudate as it cools on leaving the extruder. Again, a high proportion of polymer in the granules is needed to prevent deformation of the granules, and this may detrimentally alter the properties of the bitumen and/or may increase the cost of the granules such that they are unlikely to be economical.

The present inventors have sought to provide an alternative method of preparing binder units that can be transported at ambient temperatures and are not subject to creep and agglomeration.

SUMMARY OF THE INVENTION

Accordingly the present invention provides a method for preparing a plurality of coated binder units wherein each of the coated binder units comprises a core of a binder coated with a layer of coating material, which method comprises the steps of:

(a) providing a coated binder which comprises a core of a binder coated with a layer of coating material; and (b) dividing the coated binder into the plurality of the coated binder units by means of a system which comprises a first and a second loop that engage over part of their lengths and rotate in opposite directions, the first loop comprising a first repeating sequence of interlinked molds and the second loop comprising a second repeating sequence of interlinked molds, whereby the coated binder units are formed by welding edges of the coating and cutting the extrudate into pieces in a region where the first and the second loops engage.

The inventors have developed a process that can be used to prepare coated binder units that are not subject to agglomeration and that can be transported and stored for extended periods at ambient temperature.

DETAILED DESCRIPTION OF THE INVENTION

Figure 1:
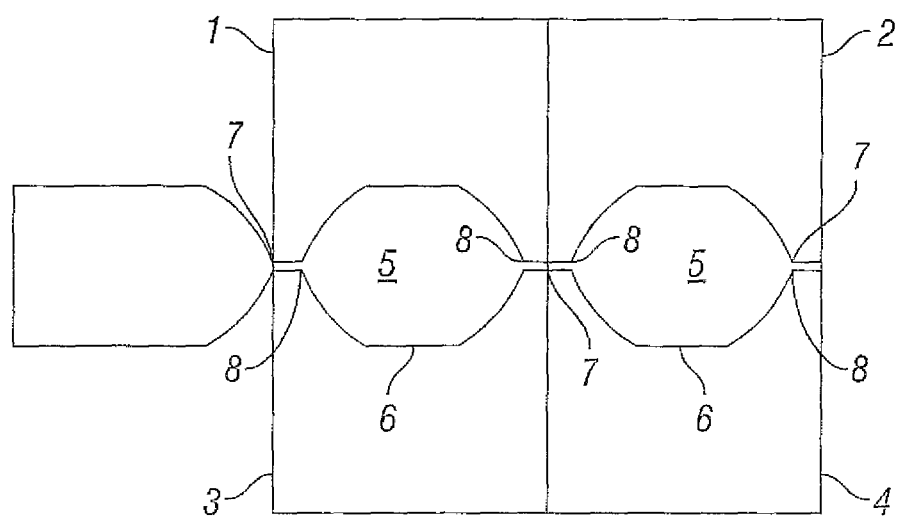
FIG. 1 shows four molds that form part of a system for dividing a coated binder into a plurality of coated binder units that can be used in the method of the present invention.

The coated binder to be used in accordance with the present invention can suitably be any type of coated binder that comprises a core of a binder coated with a layer of coating material. Suitably, the coated binder is an extrudate obtained by co-extruding the binder and the coating material. In another suitable embodiment the binder material has been incorporated in a pre-formed layer of the coating material.

The coated binder units comprise a core of binder coated with a layer of coating material. The coated binder units to be obtained in accordance with the present invention may have any desired shape. The shape of the coated binder units depends on the shape of the molds to be applied. In one embodiment of the invention, the units are pellets, having a central core of binder and an outer layer of coating material. In a second embodiment, the units are rods having a central core of binder through part or all of the length of the rod and an outer layer of coating material.

In a third embodiment of the invention, the units are slabs wherein a central layer of binder is located between outer layers of coating material. The exact shape of the coated binder units can vary, but desirably the coated binder units are of a shape and size such that they are readily handled and transported. Pellets have the advantages usually associated with the storage, flow, and handling of granular materials.

The binder is preferably a bituminous binder or is a synthetic binder having similar rheological and mechanical properties to a bituminous binder. The penetration at 25° C. of the binder (as measured according to EN 1426) is preferably between 0 and 350, more preferably between 10 and 250 dmm. The softening point of the binder (as measured according to EN 1427) is preferably between 30 and 140° C., more preferably between 35 and 95° C.

More preferably, the binder is a bituminous binder. Suitable bituminous binders include residues from the distillation of crude oil, cracked residues, naturally occurring bitumens or blends of various bitumen types. Examples of bituminous binders that may be conveniently used in the present invention include distillation or "straight run" bitumen, precipitation bitumen, e.g. propane bitumen, oxidised or blown bitumen, naphthenic bitumen or mixtures thereof. The bituminous binder may be prepared by blending a bitumen with a flux oil, e.g. an aromatic, napthenic or paraffinic flux oil, or a vegetable oil.

In an alternative embodiment, the bituminous binder may also comprise a polymer such that the binder is a polymer-modified bitumen. Suitable polymers include thermoplastic elastomers and plastomers, e.g. styrenic block copolymers and/or olefinic copolymers such as ethylene vinyl acetate. The polymer can be from petroleum or renewable origin, or rubber recovered from, for example, recycled tyres. The binder preferably contains up to 40 wt % modifiers such as polymers, based upon the weight of the binder, more preferably up to 15% modifiers.

In an alternative embodiment, the binder is a synthetic binder. The synthetic binder comprises a resin, an oil and optionally a polymer. The resin may be a resin of vegetable origin such as a rosin ester. Alternatively, the resin may be a petroleum resin or a coumarone-indene resin. The resin may have been modified such that it contains carboxylic acid, carboxylic acid anhydride or hydroxyl groups, as described in EP 179 510. The oil may be a vegetable oil or a mineral lubricating oil extract, e.g. a Bright-Stock extract.

The binder may comprise a filler material. The filler material may be any mineral material wherein the particle size is smaller than 75 µm. The binder may comprise up to 20 wt % filler, based upon the weight of the binder.

The binder may comprise sulphur, in amount of from 0.01 to 80 wt %, based upon the weight of the binder, more preferably from 0.01 to 50 wt %.

The coating material is a material that inhibits agglomeration of the coated binder units when the units are stored at ambient conditions. The coating material may improve the aesthetic aspects of the coated binder units (e.g. may be coloured), may provide information (e.g. may be printed with text or an image) and/or may improve the binding functions of the binder.

The coating material is preferably a polymer, bitumen having a penetration at 25° C. of less than 5 dmm, sulphur, blends of these materials with filler materials, blends of these materials with fibre materials, and blends of two or more of these materials. More preferably the coating material is a polymer or a blend comprising at least 50 wt % polymer. The polymer may be of renewable origin and/or may be biodegradable and/or be a recycled material. In one embodiment, the coating material is a polyolefin such as polyethylene or polystyrene, or is a blend comprising at least 50 wt % polyolefin. Preferably the coating material is polyethylene or a blend comprising at least 50 wt % polyethylene. In another embodiment, the coating material is a thermoplastic elastomer or plastomer, or a blend comprising at least 50 wt % of a thermoplastic elastomer or plastomer. In this embodiment the polymer is used both as a coating material (to inhibit agglomeration of the units) and as a component of the binder formulation, improving the properties of the product that will be made from the binder. The thermoplastic elastomer or plastomer may be a styrenic block copolymer, olefinic copolymer such as ethylene vinyl acetate, polyurethane or polyether-polyester copolymer.

The coating material may contain additives that enhance the properties of asphalt that is produced from the coated binder units.

The coated binder unit may comprise further additives, e.g. softening agents such as wax or penetration index boosters such as waxes, polyphosphoric acid and ethylene polymers. However, in a preferred embodiment the coated binder unit consists essentially of the binder and the coating material.

The melting point of the coating material is preferably lower than 200° C. to prevent emissions from the binder, more preferably below 180° C., most preferably below 160° C. to provide easy subsequent melting.

The layer of coating material in the coated binder units of the invention is preferably substantially continuous, such that at least 90% of the surface area of the core of binder is coated with the coating material, more preferably at least 95%, most preferably at least 99%.

The weight ratio of binder to coating material is preferably at least 5:1, more preferably at least 10:1, most preferably at least 30:1. It is desirable to minimise the quantity of coating material if the coating material is a more expensive component than the binder material. If the coating material is a polymer, the polymer may be chosen such that it has positive effects on the resulting binder product and the amount of coating material may be a balance between improved properties and cost. Where the coating material is a thermoplastic elastomer or plastomer, a suitable weight ratio of binder to coating material is between about 99:1 and 9:1.

The average thickness of the layer of coating material is preferably at least 10 µm. The layer needs to be sufficiently thick to avoid leakage of the binder. The average thickness of the layer of coating material can suitably be in the range of from 0.01 to 5 mm, preferably in the range of from 0.05 to 0.5 mm. Preferably, the thickness of the layer is less than 3 mm, more preferably is less than 1 mm and most preferably less than 0.4 mm. A layer thicker than 3 mm is not preferred if it is desirable to minimise the quantity of coating material.

Suitably, the diameter of the core of binder is in the range of from 5 to 100 mm, preferably in the range of from 10 to 50 mm.

The cross-section of the coated material may be a variety of shapes, e.g. circular, oval, polygonal, scarre, etc. The average hydraulic diameter of the coated material is preferably less than 200 mm, more preferably less than 80 mm, yet more preferably less than 50 mm.

Suitably, the method comprises a step of co-extruding the binder and the coating material, thereby producing an extrudate of binder coated with a layer of coating material. Extrusion is a process wherein a material is pushed and/or drawn through a die of the desired shape. In co-extrusion, two or more materials are extruded simultaneously.

Suitably, the coated material is prepared by filling a preformed shape of coating material (tube of circular, rectangular or complex shape).

The coated material will be transformed into distinct units through a dividing step. In the embodiment where the units are pellets, the size of the pellets is preferably such that the average longest dimension of the pellets is preferably less than 200 mm, more preferably less than 80 mm, yet more preferably less than 50 mm.

The pellets are preferably substantially cylindrical or of flat rectangular shape because their transportation is relatively easy (these shapes have good packing density). However, the pellets may also be spherical, spheroid, or may have irregular shapes.

The dividing step (b) in accordance with the present invention is highly attractive, because locally the melted layer of coating material will allow sealing of the edges. Preferably, all the edges of the pieces will be sealed and coated binder units will be obtained of which the core of binder is completely covered by the layer of coating material. In this way, highly attractive coated binder units can be prepared that are not subject to agglomeration and that can be transported and stored for extended periods at ambient temperature.

Welding or sealing of the pellets is achieved in two steps: (1) as the two molds forming one pellet approach each other the binder is forced to flow towards the center of the pellet creating a section near the edge of the extrudate consisting essentially of coating material; (2) welding is achieved by compressing the molten edges of the coating against each other.

Cutting with a certain angle (from the direction perpendicular to the extrudate) is even more preferred as the shear generated during the cutting movement will stretch the outer layer and facilitate sealing.

To improve the efficiency of the dividing step, the present invention proposes to mechanise the division of the coated binder into the plurality of the coated binder units by means of a system which comprises a first and a second loop that engage over part of their lengths and rotate in opposite directions, the first loop comprising a first repeating sequence of interlinked molds and the second loop comprising a second repeating sequence of interlinked molds, whereby the coated binder units are formed by cutting the coated material into pieces and welding edges of the pieces in a region where the first and the second loops engage.

Each respective mold of the first loop engages with only a single respective mold of the second loop.

Preferably, each pair of molds has a uniform configuration, allowing the coated binder units to be formed of a mirror-symmetrical shape.

The molds will usually have the same shape or configuration, allowing all the coated binder units to have the same shape. However, in an alternative embodiment the molds may have different shapes, provided the first and second molds have a uniform configuration, allowing the coated binder units to be formed of a mirror-symmetrical shape. In another alternative embodiment, the active region of the mold can be reduced just to the welding regions, thus allowing the binder units shape between welding points to be freely formed. In this way coated binder units could be made having different shapes.

Suitably, the molds are designed to form two or more coated binder units simultaneously.

Preferably, in the region each respective one of the first molds engages with only a single second one of the second molds during a period of time of 2 to 100 seconds.

Preferably, the rotating speed of the loops is in the range of from 0.1 to 100 m/min, more preferably in the range of from 1 to 60 m/min.

Suitably, the molds comprise a liquid cleaning system, allowing the method of the present invention to be carried over a long period of time without the need of frequent maintenance operations.

Suitably, after welding the temperature of the pieces is allowed to decrease.

To this end the molds are suitably heat-controlled to ensure welding of the layer of coating material at the edges of the pieces.

In one embodiment of the invention, the molds are mounted on a corrugator.

The coated binder units produced according to the method of the invention are suitably combined with aggregate to provide asphalt. The asphalt can be used to form asphalt pavement in conventional pavement-laying processes or alternatively can be used in joining processes such as forming joints between the gaps between paving stones or cobblestones.

The present invention also relates to a system for dividing a coated binder which comprises a core of a binder coated with a layer of coating material into a plurality of coated binder units that each comprise a core of the binder coated with the layer of coating material, which system comprises a first and a second loop that engage over part of their lengths and rotate in opposite directions, the first loop comprising a first repeating sequence of interlinked molds and the second loop comprising a second repeating sequence of interlinked molds.

Preferably, in the region each respective one of the first molds of the first loop engages in operation with only a single respective one of the second molds of the second loop.

Preferably, the first and second molds have a uniform configuration.

Preferably, in the present system the molds are heat-controlled.

FIG. 1 schematically shows two pairs of interlinked molds that form part of a system that can be used in the dividing step (b) of the method of the present invention. Molds (1) and (2) are interlinked and form part of a first loop which comprises a first repeating sequence of molds of which the other molds have not been shown. Molds (3) and (4) are interlinked and form part of a second loop which comprises a second repeating sequence of molds of which the other molds have not been shown. The two pairs of molds engage so as to cut a coated binder in the form of an extrudate (5) into pieces (6) at locations (7), whereafter the edges of the pieces are welded at locations (8) to ensure that the layer of coating material completely covers the core of binder.

Figure 2:
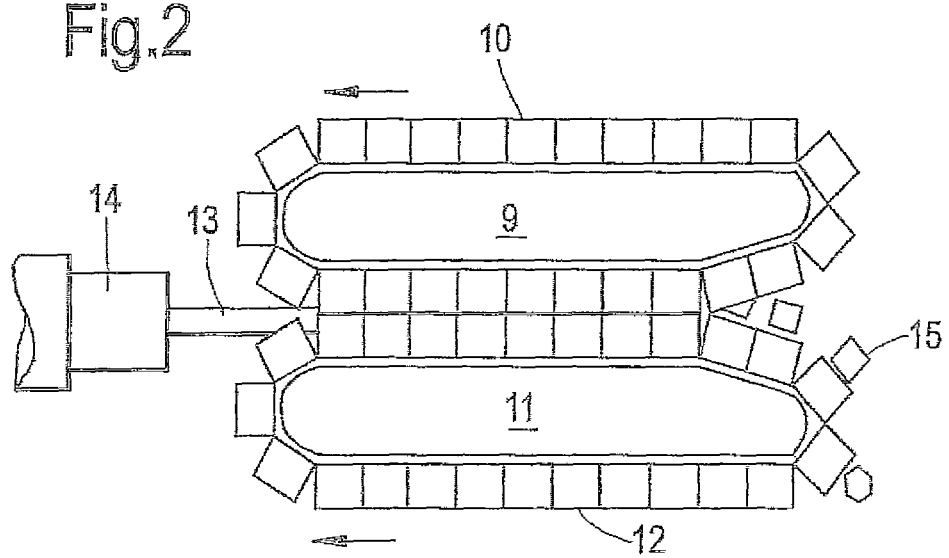
FIG. 2 shows a system for dividing a coated binder into a plurality of coated binder units that can be used in the method of the present invention.
Figure 3:
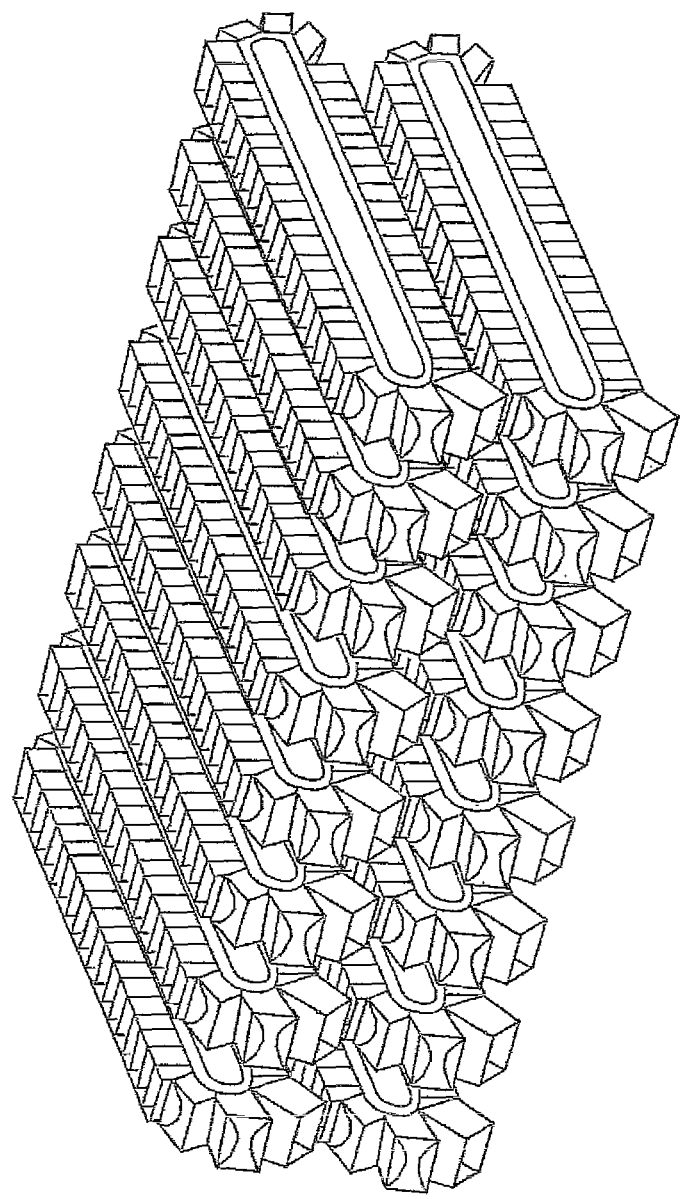
FIG. 3 shows a system for dividing a coated binder into a plurality of coated binder units that can be used in the method of the present invention, while receiving several coated binder feedings.
Figure 4:
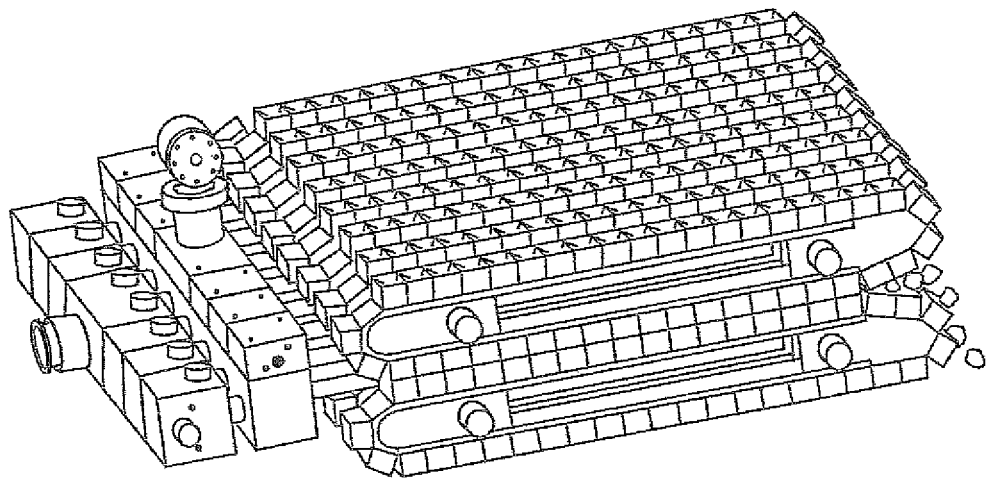
FIG. 4 shows a system for dividing a coated binder into a plurality of coated binder units that can be used in the method of the present invention, while connected to a coextrusion die which produces the coated binder material.

FIG. 2 schematically shows a system for dividing coated binder into a plurality of coated binder units. The system comprises a first loop (9) comprising a first repeating sequence of molds (10) and a second loop (11) which comprises a second repeating sequence of molds (12). The two loops (9) and (11) rotate in opposite directions and engage over part of their lengths. A coated binder in the form of an extrudate (13) obtained from a co-extrusion device (14), which extrudate comprises a rod of bitumen coated with polymer, is passed between the two loops in their rotation direction. The molds (10) and (12) cut the extrudate into pieces and inside the molds the welding takes place to ensure that the edges of the pieces are sealed. Molds (10) and (12) have a uniform configuration, allowing the coated binder units (15) to be of a mirror-symmetrical shape.

What is claimed is:

1. A method for preparing a plurality of coated binder units, which method comprises the steps of:
    (a) co-extruding a binder material, wherein said binder material comprises a bituminous binder or synthetic binder, and wherein said synthetic binder comprises a resin and oil, with a coating material, wherein said coating material is selected from a group consisting of a polymer, bitumen having a penetration at 25° C. of less than 5 dmm, sulphur, blends of said bitumen or said sulfur with filler materials, and blends of said bitumen or said sulfur with fibre materials, to form a coated binder material in the form of an extrudate, which said extrudate comprises a core of said binder material coated with a layer of said coating material; and
    (b) dividing said extrudate into said plurality of the coated binder units by means of a system which comprises a first loop comprising a first repeating sequence of first molds and a second loop comprising a second repeating sequence of second molds that are operatively engaged with each other whereby said coated binder units are formed within a region wherein said first loop and said second loop are operatively engaged by cutting said extrudate into pieces having edges of said coating material and sealing said edges by compression.

2. A method according to claim 1, wherein the first molds and the second molds are heat-controlled to ensure sealing of said edges of said coating material.

3. A method according to claim 2, wherein said first repeating sequence of molds and said second repeating of molds have a uniform configuration that allow for said coated binder units to be formed of a minor-symmetrical shape.

4. A method according to claim 1, wherein the first molds and the second molds are designed to form two or more coated binder units simultaneously.

5. A method according to claim 1, wherein the first loop and the second loop each have a rotating speed in the range of from 0.1 to 100 m/min.

6. A method according to claim 5, wherein the rotating speed is in the range of from 1 to 60 m/min.

7. A method according to claim 1, wherein after sealing of the edges of the coating material the temperature of the pieces is allowed to decrease.

8. A method according to claim 1, wherein the molds are equipped with a liquid cleaning system.

9. A method according to claim 1, wherein the coating material is a polymer or a blend comprising at least 50 wt % polymer.

10. A method according to claim 1, wherein the coated binder units are pellets having an average longest dimension of less than 100 mm.

11. A method according to claim 1, wherein the coated binder units are rods, having an average longest dimension of more than 50 mm and an average diameter of less than 100 mm.

12. A method according to claim 11, wherein the core of the extrudate has a diameter in the range of from 5 to 100 mm and the layer of the coating material has a thickness in the range of from 0.01 to 5 mm.

13. A method according to claim 12, wherein the thickness of the layer of coating material is in the range of from 0.05 to 0.5 mm.

14. A system for dividing an extrudate comprising a core of a binder material, wherein said binder material comprises a bituminous binder or synthetic binder, and wherein said synthetic binder comprises a resin and oil, that is coated with a layer of coating material, wherein said coating material is selected from a group consisting of a polymer, bitumen having a penetration at 25° C. of less than 5 dmm, sulphur, and blends of said bitumen and said sulphur, into a plurality of coated binder units, which system comprises a first loop comprising a first repeating sequence of first molds and a second loop comprising a second repeating sequence of second molds that are operatively engaged with each other whereby the coated binder units are formed within a region wherein said first loop and said second loop are operatively engaged by cutting said extrudate into pieces having edges of said coating material and sealing said edges by compression.

15. A system according to claim 14, wherein the first molds and the second molds have a uniform configuration.

16. A system according to claim 15, wherein the first molds and the second molds are heat-controlled.

* * * * *